(12) United States Patent
Patel

(10) Patent No.: US 7,203,486 B2
(45) Date of Patent: Apr. 10, 2007

(54) WIRELESS SYSTEM HAVING A DYNAMICALLY CONFIGURED MULTIMODAL USER INTERFACE BASED ON USER PREFERENCES

(75) Inventor: Ashish Raojibhai Patel, South San Francisco, CA (US)

(73) Assignee: France Telecom, Paris (FR)

( * ) Notice: Subject to any disclaimer, the term of this patent is extended or adjusted under 35 U.S.C. 154(b) by 196 days.

(21) Appl. No.: 10/440,234

(22) Filed: May 19, 2003

(65) Prior Publication Data

US 2004/0235463 A1 Nov. 25, 2004

(51) Int. Cl.
*H04M 3/00* (2006.01)

(52) U.S. Cl. ............ 455/420; 455/418; 340/825.24; 340/825.25; 340/825.69; 340/825.72

(58) Field of Classification Search ........... 455/418, 455/419, 420; 340/825.22–25, 825.69, 825.76
See application file for complete search history.

(56) References Cited

U.S. PATENT DOCUMENTS

| | | | |
|---|---|---|---|
| 6,393,297 B1 * | 5/2002 | Song | 455/420 |
| 6,622,018 B1 * | 9/2003 | Erekson | 455/420 |
| 6,754,504 B1 * | 6/2004 | Reed | 455/419 |
| 6,906,635 B1 * | 6/2005 | Moutaux et al. | 340/825.22 |
| 2002/0045442 A1 * | 4/2002 | Silen et al. | 455/420 |
| 2002/0133545 A1 * | 9/2002 | Fano et al. | 455/517 |
| 2003/0038730 A1 * | 2/2003 | Imafuku et al. | 340/825.24 |
| 2003/0182243 A1 * | 9/2003 | Gerson et al. | 705/73 |

FOREIGN PATENT DOCUMENTS

WO WO 02/052812 7/2002

OTHER PUBLICATIONS

Lemon, Sumner, IDG News Service, *Hewlett-Packard Planning New iPaq Handheld* (Apr. 4, 2003). Apr. 9, 2003 <http://www.idg.net/ec?content source id=25&idgnet_page=1&page_id=9713&channel_id=1->.

Dedicated Systems Encyclopedia, *Phillips iPronto—the Dashboard for the Digital Home—Server OSGI Service Platform* (Mar. 10, 2003). Apr. 9, 2003 <http://www.realtime-info.be/vpr/layout/display/pr.asp?PRID=4149>.

3G, *3G Lab Launches Trigenix 2.0 Mobile Interface* (Feb. 11, 2003). Apr. 9, 2003 <http://www.3g.co.uk/PR/Feb2003/4869.htm>.

* cited by examiner

*Primary Examiner*—Lester G. Kincaid
*Assistant Examiner*—Dung Lam
(74) *Attorney, Agent, or Firm*—Oblon, Spivak, McClelland, Maier & Neustadt, P.C.

(57) ABSTRACT

A wireless system is provided for dynamically configuring a multimodal user interface based on user preferences to communicate with a local appliance. An appliance node is operably linked to the local appliance and configured to transmit interface format data of the local appliance for reception by the portable terminal when in the transmit vicinity of the appliance node. The portable terminal transmits an interface request therefrom in response to the reception of the interface format data. A server node is configured to receive the interface request from the portable terminal for identifying a user interface for use in interacting with the appliance. The server node transmits the identified user interface or the information for generating user interface to the portable terminal and the portable terminal presents the user interface or generates the user interface based on provided information to a user via a display of the portable terminal wherein the user may interact with the appliance in accordance with the identified user interface.

28 Claims, 4 Drawing Sheets

WIRELESS SYSTEM HAVING A DYNAMICALLY CONFIGURED MULTIMODAL USER INTERFACE BASED ON USER PREFERENCES

BACKGROUND OF THE INVENTION

The present invention relates to a wireless communication system, and, more particularly, to a system for dynamically configuring a multimodal user interface of a portable terminal based on user preferences to facilitate communication with a local appliance.

With the introduction of such wireless application protocols as 3G networks (UMTS, WCDMA) Bluetooth® and wireless fidelity (WI-FI) I.E.E.E. 802.11, there is seemingly no limit to the extent to which portable electronic devices can be employed to interact with wirelessly configured devices encountered by a user. One area in which such interactivity is commonly implemented is within an enterprise network. In WI-FI networks, a suitably configured laptop, PDA or like portable device can communicate with a network when in the range of the wireless signals of the network. In this way, such a network will include wireless nodes so that users who need to have mobile work stations can maintain access to personal preference based enterprise resources from a laptop computer and/or portable digital assistant (PDA) based on his/her preferences hosted by operator (operator affiliates) of this network.

Devices configured to access such enterprise networks will include network signal processing interfaces and employ suitable federated authentication protocols for accessing/exchanging wireless data with the network. The user will typically employ standard graphical user interfaces in accordance with application programs residing in a memory of the device to interact with the resources/functionality of the enterprise network. Yet, as wireless protocols are increasingly implemented for accessing enterprise network technologies, interoperability and cooperability among everyday electronic devices is increasingly desired.

Presently, the wireless capability of portable electronic device while often employed to access networks in a known manner, does not currently offer a flexibility in discovering and communicating with encountered appliances outside of the enterprise environment. For example, a traveling user having a portable electronic device configured for wireless communication local, e.g., Wi-Fi, Bluetooth® and remote 2.5G, 3G cellular networks, encountering an appliance cannot presently interact with the appliance via the local wireless bearer. Further, it is desirable to interact with this appliance by way of a multimodal, dynamically configured interface such as to present the content/functionality appliance in a preferred language or in accordance with user preferences.

As such, a wireless system and related methodology capable of distributing/configuring a multimodal user interface via a service provider network is provided herein, devoid of the aforementioned limitations, and capable of providing a deployable, configurable and interoperable application framework components that aid in hosting, discovering and consuming local appliance services dynamically.

SUMMARY OF THE INVENTION

An exemplary embodiment of the present invention provides a wireless system which employs a service provider network, e.g., xDSL or 2.5G/3G, to facilitate communication with a local appliance by way of a multimodal user interface. The system dynamically configures the multimodal user interface at a portable terminal to communicate with the local appliance in a "push" (i.e., unsolicited data reception) configuration and associated methodology.

An appliance node is operably linked to the local appliance and configured to transmit interface format data of the local appliance for reception by the portable terminal when in the transmit vicinity of the appliance node. The portable terminal transmits an interface request therefrom in response to the reception of the interface format data. A server node is configured to receive the interface request from the portable terminal for identifying a user interface or user preference based information for delivery to the portable terminal for use in interacting with the appliance. The server node transmits the identified user interface or the information that helps in generating user interface locally at the portable terminal and the portable terminal presents the user interface or generates the user interface based on provided information to a user via a display of the portable terminal wherein the user may interact with the appliance in accordance with the identified user interface.

In another aspect of the invention, a "pull" (i.e., data request) topology and associated methodology is employed to dynamically configuring a multimodal user interface at a portable terminal to communicate with a local appliance.

An appliance node operably linked to the local appliance is configured to receive a polling signal of the portable terminal when the portable terminal is in the vicinity of the appliance node. The local appliance is responsive to the polling signal for transmitting an identification signal to the portable terminal. The portable terminal transmits an interface format data request therefrom in accordance with the identification signal. A server node is configured to receive the interface format data request from the portable terminal for identifying a user interface or user preference based on information for delivery to the portable terminal for use in interacting with the appliance. The server node transmits the identified user interface or the information that helps in generating user interface locally at the portable terminal. The portable terminal presents the user interface or generates the user interface based on provided information to a user via a display of the portable terminal wherein the user may interact with the appliance in accordance with the identified user interface.

It is to be understood that both the foregoing general description of the invention and the following detailed description are exemplary, but are not restrictive, of the invention.

BRIEF DESCRIPTION OF THE SEVERAL VIEWS OF THE DRAWING

A more complete appreciation of the invention and many of the attendant advantages thereof will be readily obtained as the same becomes better understood by reference to the following detailed description when considered in connection with the accompanying drawings wherein.

DETAILED DESCRIPTION OF THE INVENTION

Figure 1:
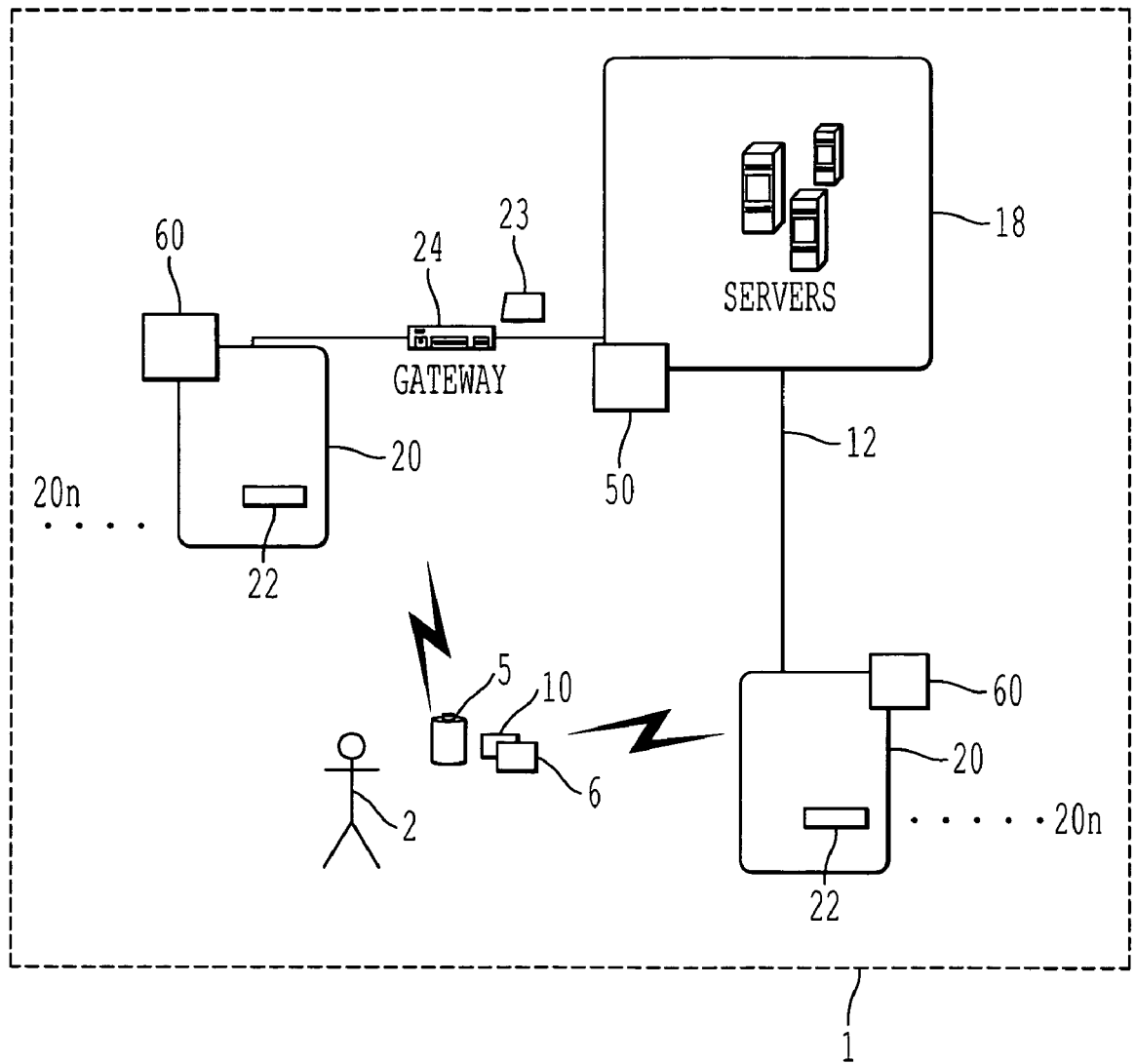
FIG. 1 is a high level network diagram of a wireless system in accordance with an exemplary embodiment of the invention.

Certain terminology used in the following description is for convenience only and is not limiting. The term "local appliance" as used herein refers to any electronic device which includes wireless capability for communicating with other wireless devices and which also may have capabilities to communicate with networks protocols, the local appliance may be physically located at any distance from the other wireless devices capable of exchanging data therebetween, the ability to pass communications therebetween being a function of the transmission range, power and wireless application protocol of the respective devices. In the drawings, the same reference numerals are used for designating the same elements throughout the several figures.

I. Functionality Overview

The present invention, as disclosed in the foregoing exemplary embodiment provides a wireless system which employs a service provider network to facilitate communication with a local appliance by way of a multimodal user interface. In the exemplary embodiment, the service provider network is a wide area network, and may include non-traditional components such as satellite, RF, cellular network services, infrared, and PCS network services for serving as mobile portals, as well as, traditional Internet Backbone services such as France Telecom's Wandoo and Orange services serving as hard wired portals. The wireless system effectively discovers and consumes locally hosted services through a combination of technologies Bluetooth®, RFID, Smart-Tags, Wi-Fi, JINI, lightweight XML Web services (SOAP, UDDI, WSDL) and like web and wireless application protocols (WAP) which are known to those skilled in the art.

In operation, based on user requirements and preferences, the wireless system enables dynamic provisioning of user interfaces to interact with local services at a portable terminal. The system employs industry accepted wireless application protocols and technology to detect and consume local services by using a user defined profile available with the service provider. In this way, application framework components are defined which enable a portable user device to dynamically discover and consume locally hosted services based on a user profile.

Referring now to FIG. 1, a network diagram of the wireless system 1 is shown for describing the high level functionality of network components in accordance with an exemplary embodiment of the invention. In the high level diagram of FIG. 1, the description of individual server functionality, and traditional network components such as routers are omitted for sake of simplicity. The network diagram includes a portable terminal, generally designated 5, appliances 20 having appliance nodes 22, gateway 24 and a service provider generally designated 18.

The portable terminal 5 is embodied by a personal digital assistant 5 having client-side software applications, including a wireless access client manager generally designated 10, and policy file 6. In the exemplary embodiment the client manager 10 runs as a background process or daemon and policy file 6 is a sub-component of portable access client manager 10 accessed from a memory of the portable terminal 5, shown here separately for illustrating individual functionality. While the portable terminal 5 is described and depicted herein as a personal digital assistant (PDA) for sake of simplicity, those skilled in the art will recognize that the function of the portable terminal 5 may be embodied by any number of electronic devices, such as a laptop computer, cellular phone, portable audio device, paging device, navigation device, video game device, and the like. Of course such devices are submitted as illustrative examples only, and not an exhaustive list. In such embodiments, applications such as data synchronization, unified messaging and software updating may be employed as part of the portable access client manager platform 10 to make the portable access experience more seamless and robust.

As discussed above, the portable terminal 5 of the exemplary embodiment, is a PDA. Of course, a suitable operating system of the terminal 5 functions to cooperate with the client manager 10 to effect execution on the portable terminal 5. In the exemplary embodiment a graphical user interface (GUI) based operating system is described for use with a display of the portable terminal 5, however alternative operating systems may be employed such as voice activated menus systems as known to those skilled in the art. The description of standard device features, such as local volatile and/or non-volatile memory, I/O capabilities, as well as hardware component functionality have been omitted for brevity, the detailed operation/description of which is well known to those skilled in the art. The portable terminal 5 is employed by a user 2. The portable terminal 5 is configured to exchange data with appliances 20 and/or service provider 18 via a mobile portal 14 or traditional network 12, such as the Internet for connecting to the service provider 18.

Figure 2:
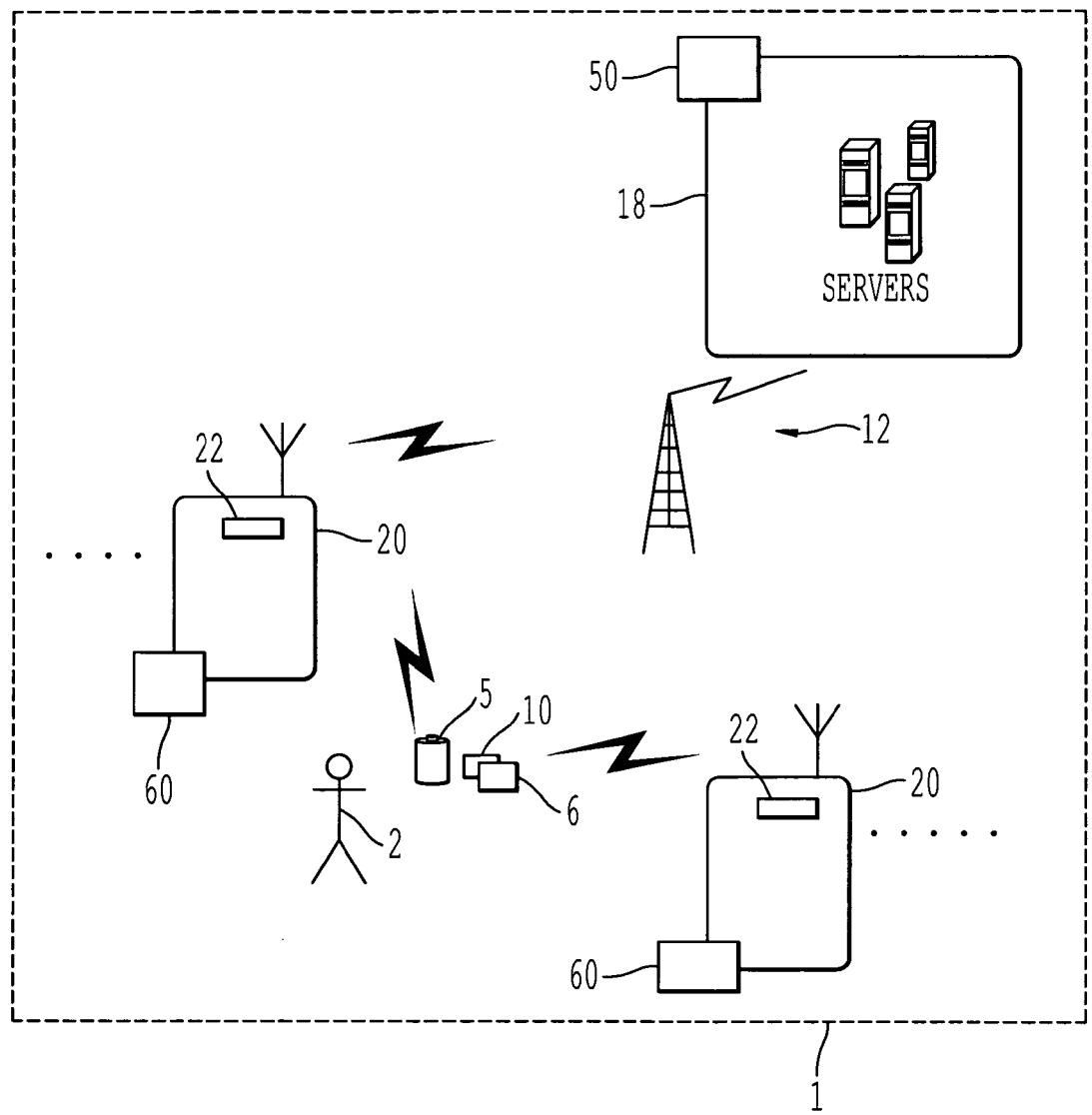
FIG. 2 is a high level network diagram of a wireless system having a mobile portal in accordance with an exemplary embodiment of the invention.

In the exemplary embodiment, the service provider 18 may be one of a plurality of Internet Service Providers (ISP). The service provider 18 includes server manager client 50 for processing data of the appliances 20 and portable terminal 5 in accordance with the invention as described in detail below. While the service provider 18 is typically employed as communicating via a TCP/IP protocol stack for effecting communication with the network 12, those skilled in the art will recognize that alternative networking technologies are likewise embraced by the teachings of the present invention. Likewise, the discussion of routine HTTP protocol handshaking and DNS query processing is omitted here for sake of brevity. Moreover, the network technologies described herein, while described and depicted in portions as hard wire implementations, wireless implementations, satellite links and the like may be substituted throughout as shown in FIG. 2. Of course, those skilled in the art will recognize that both portable terminal 5 and appliance 20 may communicate via different ISPs for transferring data to different server managers 50.

A gateway 24 is illustrated in FIG. 1 to illustrate an implementation of the invention typically found in the home. The gateway of the exemplary embodiment serves as an intermediary between networked components of the home and network 12 as known to those skilled in the art. In the exemplary embodiment, gateway 24 employs a management client 23 for exchanging data with the wireless application protocol in accordance with the present invention, the gateway 24 or set-top-box is typically encountered in DSL and other broadband applications. Further, the gateway 24 may interface with such home based network technologies as Ethernet, I.E.E.E. 1394 "firewire", Hyper- LAN and cooperate with such protocols as TCP/IP (DHCP, UpnP, etc), HAVI and bridging between various combinations.

Local appliances, generally designated 20, are shown having appliance nodes 22. The local appliances are devices employing the wireless application protocol of the portable terminal 5. Examples of appliances in accordance with the invention include, vending machines, information kiosks such as found at travel centers (i.e., airports, bus/train terminals and the like). The appliance nodes 22 serve as access points for exchange of data via the wireless application protocol. While illustrated in the figures as being co-located with respect to the appliances 20, those skilled in the art recognize that access nodes 22 may be located at positions away from the appliances 20 to further facilitate transmission/reception. In the exemplary embodiment of FIG. 1, appliances 20 are operably linked to a network 12 such as the Internet for exchanging data with service provider 18.

Figure 3:
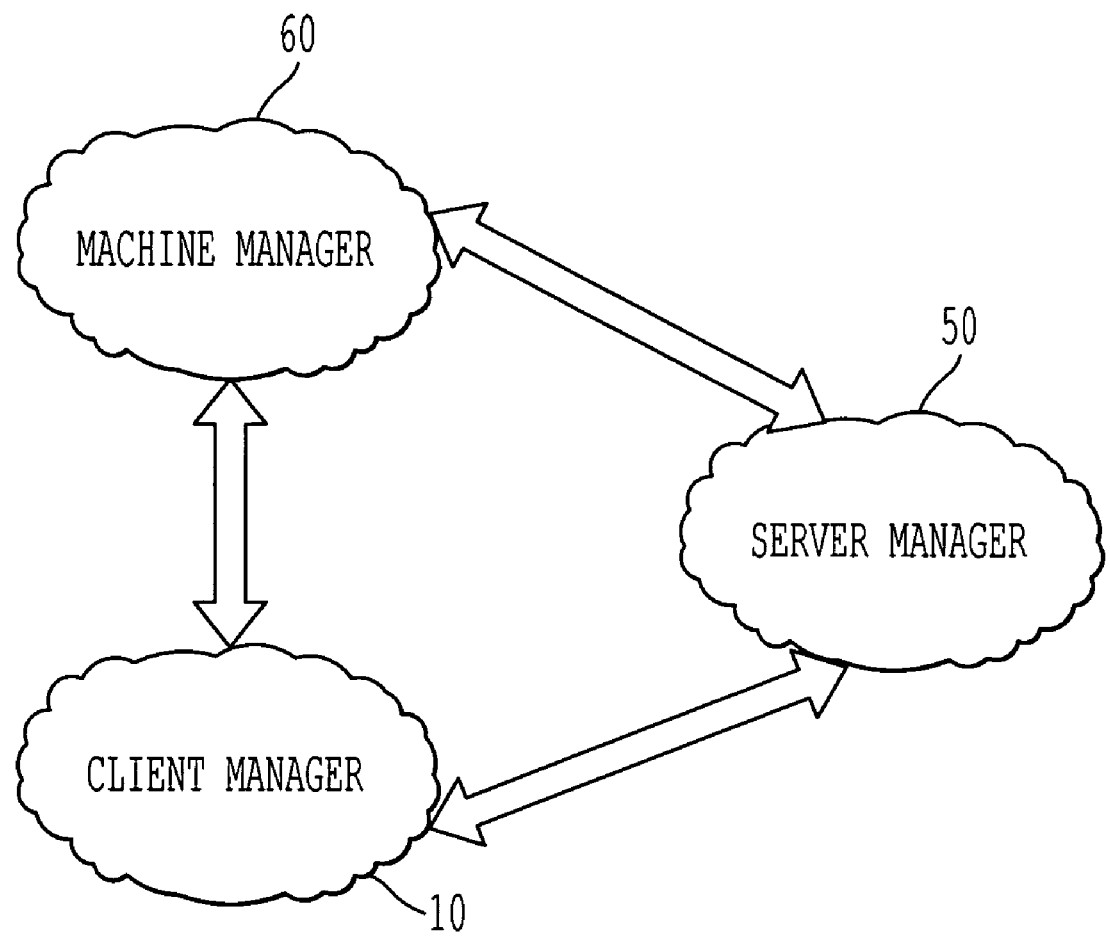
FIG. 3 is a software component interoperability diagram depicting the management software interoperability of the wireless application protocol in accordance with an exemplary embodiment of the invention.

As shown in FIG. 3, the high level architecture for employing the system 1 in accordance with the wireless application protocol of the present invention is shown, including a client manager 10, server manager 50 and machine manager 60 to illustrate their cooperative functionality. An exemplary interaction between each managing component is now described. As discusses above, the client manager 10 detects/receives (i.e., push or pull) the presence of an appliance 20 and performs initial information exchange with the machine manager 60. The machine manager 60 provides primary information regarding the corresponding appliance 20 using an open standard based format to the client manager 10. The client manager interacts with either a gateway component of gateway 24 (not shown) in such an implementation as typically found in the home (FIG. 1), or server manager 50 by way of a mobile portal 14 or network connection 12 (FIG. 2). In this way a user 2 is able to retrieve a multimodal user interface to interact with the appliance 20 or employ user preferences in a standard format so that machine manager 50 can perform further processing in accordance with a user interface for accessing functionality/data of the appliance 20 over the wireless application protocol. Thus, the machine manager 60 delivers intended output to client manager 10. Finally, client manager 10 delivers transactional information if any to either gateway component (not shown) or to server manager 50 as outlined above or stand alone having only local wireless capabilities.

As shown in FIG. 1, client manager 10 resides on the portable terminal 5 along with user preferences 6. In an alternative embodiment, user preferences 6 may be accessed from a memory of the service provider 18 (not shown). The client manager 10 communicates with appliances 20 and mobile portal 14 or application service provider via connection offered by internet service provider 18. The client manager 10 discovers (pull) or receives (push) communications of appliances 20 in the proximity of portable terminal 5 over the wireless application protocol. Where two or more appliances are communicating to the portable terminal 5 a selection display may be presented to user 2 for identifying and proceeding with a selected appliance 20. This communication provides the initial exchange of information with the appliance 20 to identify the type of user interface/information the appliance 20 requires. In the exemplary embodiment, this information may include a model number, serial number, manufacturer, and appliance type code. The information is then utilized by the portable terminal 5 and provided to either the gateway 24 in case of a home network or to server manager 50. The desired user interface (voice or text input based) or information to communicate with the appliance 20 is obtained from gateway 24 or server manager 50. Finally, transaction information of the portable terminal 5 may be provided to gateway 24 or server manager 50 to track user interface/access habits/recording purchase for billing purpose.

The gateway manager 23 resides on gateway 24 in the home (FIG. 1). The gateway manager 23 communicates with portable terminal 5 over wireless application protocol. The gateway manager 23 of gateway 24 obtains information from portable terminal 5 pertaining to characteristics of appliance 20. The gateway manager 23 would then transfer the appliance characteristics to server manager 50 and obtain a desired user interface from server manager 50 to enable the portable terminal 5 to interact with the appliance 20. Finally, transaction information of the portable terminal 5 may be provided to the server manager 50.

The server manager 50 resides at the service provider 18 and communicates to gateway 24 over network 12 or to the portable terminal 5 over the wireless application protocol via mobile portal 14. The server manager 50 obtains appliance characteristics from either gateway 24 over DSL network or the portable terminal 5 over the wireless application protocol. The server manager 50 provides a desired user interface or required user preference information to either gateway 24 or portable terminal 5. Finally, the server manager 50 may record transaction information sent by gateway 24 or portable terminal 5 as marketing intelligence or recording purchase for billing purpose.

The machine manager 60 resides on appliance 20 or appliance node 22 to communicate with the portable terminal 5 over the wireless application protocol to provide additional functionalities apart from general functions performed by the appliance 20 in accordance with an exemplary embodiment of the invention. The machine manager 60 provides machine characteristics in given format to the portable terminal 5 (e.g., XML data) that would identify which type of user interface or information the appliance 20 would need to provide further processing and, interact with the portable terminal 5 once the desired user interface has been configured.

II. User Interface Configuration

In the exemplary embodiment, the client manager 10 may operate in either one of a push or pull configuration. In the push configuration, the portable terminal 5 receives transmissions from appliances 20 in the vicinity. In the pull configuration, the portable terminal transmits a polling signal to discover appliances 20 in the vicinity.

Figure 4:
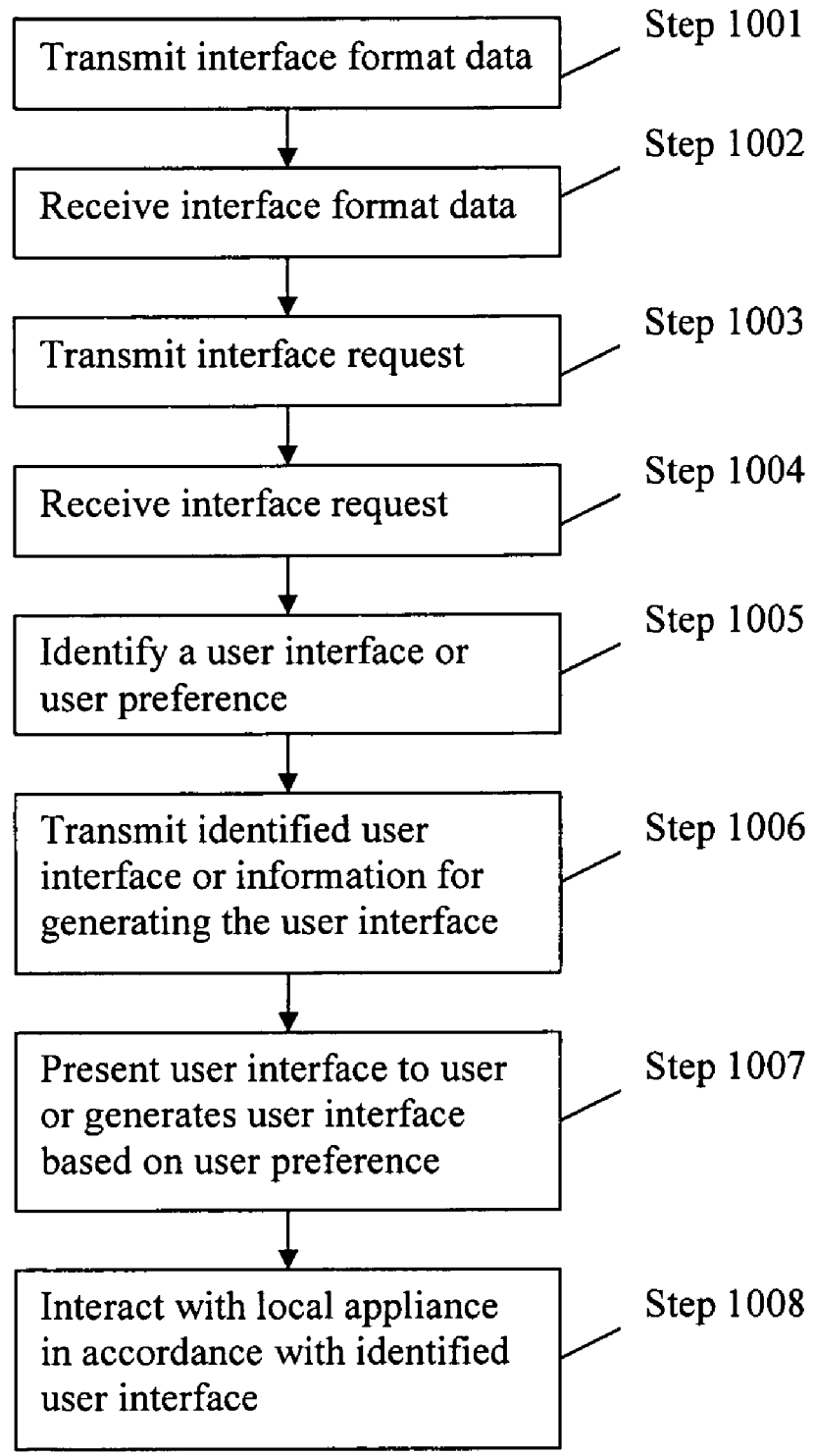
FIG. 4 is a flow chart of a communication for configuring a multimodal interface in accordance with an exemplary embodiment of the invention.

Referring now to FIGS. 1–2, 4 in the push configuration, an appliance node 22 of a local appliance is configured to transmit interface format data (FIG. 4, Step 1001) of the local appliance 20 for reception by the portable terminal 5 when in the transmit vicinity of the appliance node 22. In response, the portable terminal 5 transmits an interface request therefrom (FIG. 4, Step 1003) in response to the reception of the interface format data (FIG. 4, Step 1002) to either one of a mobile portal 14 or the appliance 20. The service provider 18 is configured to receive the interface request (FIG. 4, Step 1004) from the portable terminal 5 by way of the mobile portal 14 or through appliance 20 by way of network 12. The service provider 18 identifies a user interface or the information that helps in generating user interface locally at the portable terminal 5 for use in interacting with the appliance 20 (FIG. 4, Step 1005). In the exemplary embodiment, the server 18 delivers a user interface (FIG. 4, Step 1006) to the portable terminal 5 in accordance with the interface format data and the user interface or the information that helps in generating user interface locally at the portable terminal 5 may be optimized at the portable terminal by user preferences stored locally. In an alternative embodiment, the user interface may be optimized in accordance with user preferences stored at the service provider location before delivery to the portable terminal 5. The user interface is then configured on the portable terminal 5 (FIG. 4, Step 1007) via a display of the portable terminal wherein the user may interact with the appliance in accordance with the identified user interface (FIG. 4, Step 1008).

In an alternative push configuration, rather than transmitting an interface request in response to the reception of a pushed signal from an appliance node 22, the portable terminal 5 may simply receive parameters from the appliance 22. For example, if a user 2 is in the vicinity of an airport scheduling appliance, he may receive information pertaining to a specific flight arrival departure time in accordance with user flight data stored locally in portable terminal 5 as a user preference or the user flight data stored at the service provider end. In this embodiment, the portable terminal 5 would not provide any communication to the appliance 22.

In the pull configuration, an appliance node 22 of a local appliance 20 is configured to receive a polling signal of the portable terminal 5 when the portable terminal 5 is in the vicinity of the appliance node 22. The local appliance 20 is responsive to the polling signal for transmitting an identification signal to the portable terminal 5. The portable terminal transmits an interface format data request therefrom in accordance with the identification signal to either one of a mobile portal 14 or to the appliance 20. The service provider 18 is configured to receive the interface format data request from the portable terminal 5 by way of mobile portal 14 or network 12 for identifying a user interface for use in interacting with the appliance 20. In the exemplary embodiment, the server 18 delivers a user interface or the information that helps in generating user interface locally at the portable terminal 5 to the portable terminal 5 in accordance with the interface format data and the user interface or the information that helps in generating user interface locally at the portable terminal 5 may be optimized at the portable terminal by user preferences stored locally. In an alternative embodiment, the user interface may be optimized in accordance with user preferences stored at the service provider location before delivery to the portable terminal 5. The user interface is then configured on the portable terminal 5 via a display of the portable terminal wherein the user may interact with the appliance in accordance with the identified user interface.

Whether in push or pull configuration, the communication provided to service provider 18 may further exchange authentication data (i.e., user/appliance id, password) in accordance with a federated authentication protocol with the access provider 18 for identifying the user 2 and/or appliance 20. Those skilled in the art will recognize that a variety of authentication methods may be employed in the exemplary embodiment of the invention, including but not limited to Challenge Handshake Authentication Protocol (CHAP), CHAP and password Authentication Protocol (PAP), and PAP SAML based authentication framework.

In an alternative embodiment, the user 2 may provide data of the appliances/transactions encountered to the service provider 18 stored locally in the portable terminal 5 in exchange for compensation, a discount, or value added service of the service provider 18. Likewise, the user 2 may receive credits from the service provider 18 in exchange for the transaction data to be used in the consumption of appliance related services. Of course, users wishing to protect their privacy would have the option to disable this feature by way of client manager 10.

Thus, as can be appreciated from the above description of FIG. 1, a user 2 can interact with appliances 20 in the home and in public areas with the help of his/her portable terminal 5. For example, in the home a user 2 can be provided a menu on the portable terminal 5 to interact with home appliances based on the presence of the user 2 in a particular room, or the user 2 could obtain a user interface for a newly purchased appliance. Moreover based on user preferences stored in the portable terminal 5 or at the service provider 18 (i.e. birth date, holiday, marriage anniversary) a menu with different look would be configured for the user 2.

Also as shown in the configuration of FIG. 2, a traveling user 2 would interact with appliances 20 as shown. For example, while entering into a rental car the portable terminal 5 would retrieve user preferences from his/her mobile portal 14, or user preferences stored locally and using car preferences like seat adjustment, radio station, temperature etc. adjust appliances 20 of the car accordingly by communicating with a gateway present in the car which would in turn send signals to sensors offering seat adjustment facilities and the like. Likewise at a Bus/Railway station a user 2 can purchase a ticket from vending appliance 20 employing a user interface provided to the portable terminal 5 in the preferred language. Outside of the home, such as while traveling through an airport, the user 2 can access information about flight schedule, gate information via portable terminal 5 by interacting with local appliances 20 employing the wireless application protocol in accordance with the present invention based on his/her flight information stored on the portable terminal 5 or at the service provider 18. A further implementation would enable the user 2 to obtain information about menu of different restaurants, on his/her portable terminal 5 by accessing local appliances 20 based on his/her food preferences stored on the portable terminal 5 or at the service provider 18.

Obviously, readily discernible modifications and variations of the present invention are possible in light of the above teachings. It is therefore to be understood that within the scope of the appended claims, the invention may be practiced otherwise than as specifically described herein. For example, while described in terms of both software and hardware components interactively cooperating, it is contemplated that the system described herein may be practiced entirely in software. The software may be embodied in a carrier such as magnetic or optical disk, or a radio frequency or audio frequency carrier wave.

Thus, the foregoing discussion discloses and describes merely exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A wireless system for dynamically configuring a multimodal user interface at a portable terminal to communicate with a local appliance, comprising:
an appliance node operably linked to the local appliance and configured to transmit interface control format data of the local appliance for reception by the portable terminal when in the vicinity of the appliance node, the portable terminal transmitting an interface request therefrom in response to the reception of the interface control format data;
a server node configured to receive the interface request from the portable terminal for identifying a user interface or user preference based information for delivery to the portable terminal for use in interacting with the local appliance, the server node transmitting the identified user interface or information for generating the user interface to the portable terminal; and
the portable terminal presenting the user interface or generating the user interface based on user preference based information to a user via a display of the portable terminal,
wherein the portable terminal is further configured to allow the user to interact with the local appliance in accordance with the identified user interface.

2. The system of claim 1, wherein the identified user interface is configured at the portable terminal in accordance with predetermined user preferences.

3. The system of claim 2, wherein the preference data stored at the portable terminal includes a preferred language of the user for presenting the user interface in the preferred language.

4. The system of claim 1, wherein the portable terminal presents the user with a selection screen of the display when in the vicinity of two or more local appliances to allow the user to select one local appliance of the two or more local appliances transmitting an interface request.

5. The system of claim 1, wherein the portable terminal further comprises: a client manager for receiving and transmitting data between the portable terminal, the appliance node, and the server node.

6. The system of claim 5, wherein the client manager provides user preferences to the server node for use in selecting the user interface.

7. The system of claim 1, further comprising: a gateway node for receiving the transmitted format data from the portable terminal for providing the transmitted format data to the server node and for receiving the identified user interface from the server node for provision to the portable terminal.

8. The system of claim 1, wherein the wireless system employs a radio frequency.

9. The system of claim 1, wherein said user interface or information for generating the user interface transmitted by the server node is stored at the portable terminal.

10. A wireless system for dynamically configuring a multimodal user interface at a portable terminal to communicate with a local appliance, comprising:
an appliance node operably linked to the local appliance and configured to receive a polling signal of the portable terminal when the portable terminal is in the vicinity of the appliance node, the local appliance being responsive to the polling signal for transmitting an identification signal to the portable terminal, the portable terminal transmitting an interface control format data request therefrom in accordance with the identification signal;
a server node configured to receive the interface control format data request from the portable terminal for identifying a user interface or user preference based information for delivery to the portable terminal for use in interacting with the local appliance, the server node transmitting the identified user interface or information for generating the user interface to the portable terminal; and
the portable terminal presenting the user interface or generating the user interface based on user preference based information to a user via a display of the portable terminal,
wherein the portable terminal is further configured to allow the user to interact with the local appliance in accordance with the identified user interface.

11. The system of claim 10, wherein the identified user interface is configured at the portable terminal in accordance with predetermined user preferences.

12. The system of claim 11, wherein the preference data stored at the portable terminal includes a preferred language of the user for presenting the user interface in the preferred language.

13. The system of claim 10, wherein the portable terminal presents the user with a selection screen of the display when in the vicinity of two or more local appliances to allow the user to select one local appliance of the two or more local appliances transmitting an interface request.

14. The system of claim 10, wherein the portable terminal further comprises: a client manager for receiving and transmitting data between the portable terminal, the appliance node, and the server node.

15. The system of claim 14, wherein the client manager provides user preferences to the server node for use in selecting the user interface.

16. The system of claim 10, further comprising: a gateway node for receiving the transmitted format data from the portable terminal for providing the transmitted format data to the server node and for receiving the identified user interface from the server node for provision to the portable terminal.

17. The system of claim 10, wherein the wireless system employs a radio frequency.

18. The system of claim 10, wherein said user interface or information for generating the user interface transmitted by the server node is stored at the portable terminal.

19. A method of dynamically configuring a multimodal user interface at a portable terminal to communicate with a local appliance based upon user preferences, comprising the steps of:
transmitting interface control format data from an appliance node operably linked to the local appliance;
receiving the interface control format data at the portable terminal when in the vicinity of the appliance node;
transmitting an interface request from the portable terminal in response to the reception of the interface control format data;
receiving the interface request from the portable terminal at a server node for identifying a user interface or user preference based information for delivery to the portable terminal for use in interacting with the local appliance;
transmitting from the server node the identified user interface or information for generating the user interface to the portable terminal; and
presenting the user interface or generating the user interface based on user preference based information to a user via a display of the portable terminal, wherein the user may interact with the local appliance in accordance with the identified user interface.

20. The method of claim 19 further comprising the step of: querying the user via the portable terminal to opt to transmit transaction data to the server node upon completion of interaction with the local appliance.

21. The method of claim 19, further comprising a step of storing the transmitted user interface or information for generating the user interface at the portable terminal.

22. A method of dynamically configuring a multimodal user interface at a portable terminal to communicate with a local appliance based upon user preferences, comprising the steps of:
receiving a polling signal of the portable terminal at an appliance node operably linked to the local appliance when the portable terminal is in the vicinity of the appliance node;
transmitting an identification signal to the portable terminal;
transmitting an interface control format data request from the portable terminal in accordance with the identification signal;
receiving the interface control format data request from the portable terminal at a server node for identifying a user interface or user preference based information for delivery to the portable terminal for use in interacting with the local appliance;
transmitting the identified user interface or information for generating the user interface from the server node to the portable terminal; and
presenting the user interface to a user via a display of the portable terminal,
wherein the user may interact with the local appliance in accordance with the identified user interface.

23. The method of claim 22 further comprising the step of: querying the user via the portable terminal to opt to transmit transaction data to the server node upon completion of interaction with the local appliance.

24. The method of claim 22, further comprising a step of storing the transmitted user interface or information for generating the user interface at the portable terminal.

25. A computer readable medium encoded with computer program instructions that cause a computer to perform a method of dynamically configuring a multimodal user interface at a portable terminal to communicate with a local appliance, wherein the medium is neither a radio frequency nor an audio radio frequency carrier wave, the method comprising steps of:
transmitting interface control format data from an appliance node operably linked to the local appliance;
receiving the interface control format data at the portable terminal when in the vicinity of the appliance node;
transmitting an interface request from the portable terminal in response to the reception of the interface control format data; receiving the interface request from the portable terminal at a server node for identifying a user interface or user preference based information for delivery to the portable terminal for use in interacting with the local appliance;
transmitting from the server node the identified user interface or information that helps in generating the user interface to the portable terminal; and
presenting the user interface or generating the user interface based on user preference based information to a user via a display of the portable terminal,
wherein the user may interact with the local appliance in accordance with the identified user interface.

26. The computer readable medium of claim 25, wherein said method further comprises a step of storing the transmitted user interface or information for generating the user interface at the portable terminal.

27. A computer readable medium encoded with computer program instructions that cause a computer to perform a method of dynamically configuring a multimodal user interface at a portable terminal to communicate with a local appliance, wherein the medium is neither a radio frequency nor an audio frequency carrier wave, the method comprising steps of:
receiving a polling signal of the portable terminal at an appliance node operably linked to the local appliance when the portable terminal is in the vicinity of the appliance node;
transmitting an identification signal to the portable terminal;
transmitting an interface control format data request from the portable terminal in accordance with the identification signal;
receiving the interface control format data request from the portable terminal at a server node for identifying a user interface or user preference based information for delivery to the portable terminal for use in interacting with the local appliance; p1 transmitting the identified user interface or information for generating the user interface from the server node to the portable terminal; and
presenting the user interface or generating the user interface based on user preference based information to a user via a display of the portable terminal,
wherein the user may interact with the local appliance in accordance with the identified user interface.

28. The computer readable medium of claim 27, wherein said method further comprises a step of storing the transmitted user interface or information for generating the user interface at the portable terminal.

* * * * *

UNITED STATES PATENT AND TRADEMARK OFFICE
CERTIFICATE OF CORRECTION

PATENT NO. : 7,203,486 B2  Page 1 of 1
APPLICATION NO. : 10/440234
DATED : April 10, 2007
INVENTOR(S) : Ashish Patel It is certified that error appears in the above-identified patent and that said Letters Patent is hereby corrected as shown below:

Column 12, Line 38, delete "p1".

Signed and Sealed this

Sixteenth Day of October, 2007

JON W. DUDAS
*Director of the United States Patent and Trademark Office*